United States Patent
Malins

(10) Patent No.: US 8,141,853 B2
(45) Date of Patent: Mar. 27, 2012

(54) CONNECTOR FOR AN INSULATOR TO BE CONNECTED TO A SUPPORT MEMBER

(75) Inventor: Craig David Malins, Hamilton (NZ)

(73) Assignee: Gallagher Group Limited, Hamilton (NZ)

( * ) Notice: Subject to any disclaimer, the term of this patent is extended or adjusted under 35 U.S.C. 154(b) by 309 days.

(21) Appl. No.: 12/125,006

(22) Filed: May 21, 2008

(65) Prior Publication Data

US 2009/0289239 A1 Nov. 26, 2009

(51) Int. Cl.
*A01K 3/00* (2006.01)
(52) U.S. Cl. .......... 256/10; 256/48; 256/54; 256/DIG. 3
(58) Field of Classification Search .................. 256/10, 256/32, 47, 48, 50, 54, 57, DIG. 3; 174/158 F, 174/161 F, 163 F
See application file for complete search history.

(56) References Cited

U.S. PATENT DOCUMENTS

| | | | |
|---|---|---|---|
| 409,905 A | | 8/1889 | Bourgeois |
| 2,896,011 A | * | 7/1959 | Huseby ...................... 174/163 F |
| 3,300,577 A | * | 1/1967 | Baatz .......................... 174/163 F |
| 3,524,923 A | * | 8/1970 | Zeeb .......................... 174/163 F |
| 3,652,780 A | * | 3/1972 | Wilson ........................ 174/163 F |
| 6,960,728 B1 | * | 11/2005 | Halderman ................ 174/158 F |
| 7,216,852 B2 | * | 5/2007 | Gravelle ........................ 256/10 |

FOREIGN PATENT DOCUMENTS

NZ 539917 6/2007
NZ 539887 7/2007

* cited by examiner

*Primary Examiner* — Michael P Ferguson
(74) *Attorney, Agent, or Firm* — Knobbe, Martens, Olson & Bear LLP

(57) ABSTRACT

A connector for an insulator to be connected to a support member is disclosed. In one embodiment, the connector includes a plurality of divergent arms. This connector may include a main body, and at least two side wings extending from the main body where each the side wing is configured to engage with at least one of the divergent arms of the support member. The connector may further include at least one strap engagement element configured to engage at least one strap to secure the connector to the support member.

8 Claims, 7 Drawing Sheets

CONNECTOR FOR AN INSULATOR TO BE CONNECTED TO A SUPPORT MEMBER

BACKGROUND OF THE INVENTION

1. Field of the Invention

This invention relates to a connector. More particularly, the invention relates to a connection system for an insulator to be connected to a support member with a plurality of diversion arms.

In particular, reference will be made to the present invention being used to connect an insulator to a T-Post for the purpose of securing an electric fence wire. However, those skilled in the art should appreciate that other applications are also available and reference to the above only throughout this specification should in no way be seen as limiting.

2. Description of the Related Technology

In a number of applications it is preferable to connect articles or loads to various forms of support members. For example, in the case of fencing systems, connectors have been developed to connect electrical insulators to conductive metal fence posts.

The connectors developed for this type of application need to provide a secure connection to the support member or post involved, and should prevent the load attached to the post from sliding up or down, rotating around or being pulled off the post.

One common form of support member or post used in a fencing application is the "T-Post" which includes three divergent arms. The T-Post has a centre arm which bisects a pair of front arms orientated in line with one another. T-Posts in basic form have been developed and marketed in varying sizes and shapes depending on the particular application within which the post is to be used. For example, it is possible to obtain T-Posts between the sizes of 1¼ inches, 1⅜ inches, and 1½ inches. It is particularly common for T-Posts to have variation in the length of the centre arm for a common or typical length of the two front arms.

As can be appreciated by those skilled in the art, it is difficult to design or provide a connector which can secure an insulator or other forms of load to different sizes of support member and in particular the different sizes of T-Posts discussed above.

Existing prior art connection systems, such as that disclosed in U.S. Pat. No. 409,905 have been designed for a single size of T-Post. The construction and form of the connector disclosed cannot be used with larger or smaller versions of the posts with which it is in turn engaged.

This approach in turn increases manufacturing costs as multiple production lines need to be implemented for the multiple designs required, and also increases the storage and stock overheads of suppliers of such connectors. Furthermore, there is also some degree of confusion and complication for users of the connectors provided and that they must ensure that they have the correct size connector for the post they will be working with.

Previous "Universal" T-Post connectors have been disclosed in NZ Patent Application No. 539917 and NZ 539887. These connectors fit securely to large and small versions of T-Posts. However, the fit and engagement of the connectors with the T-Post is provided by a very tight fit through a semi-rigid plastic device. This means that it can be very difficult to apply these devices to larger sizes of T-Posts as the connectors have very little flexibility and it may be difficult to stretch these connectors to cover larger T-Post sizes. However, this rigidity is necessary as it is the tight fit which allows the connector to engage with the T-Post and not move or slip from its location.

An improved connector which addresses any or all of the above problems would be an advantage. In particular, a connector which could secure a load firmly to a range of different sized posts while still being easy to use would be an advantage. A connector which acted as a "Universal" connector for various sizes of the T-Post, which can easily be opened to engage with larger T-Posts, and still contracted to engage with smaller sizes of T-Posts would be an advantage. This flexibility, when combined with means for preventing the load connected from sliding up or down the T-Post, or spinning around the post would also be an advantage.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

BRIEF SUMMARY OF THE INVENTION

One aspect of the present invention is a connector configured to engage with a support member, the support member including a plurality of divergent arms, where the connector includes, a main body, and at least two side wings extending from the main body, each the side wings configured to engage with at least one of the divergent arms of the support member, and at least one strap engagement element configured to engage at least one strap to secure the connector to the support member.

Another aspect of the present invention is a connector substantially as described above, wherein the connector also includes at least one central aperture configured to engage with a divergent arm of the support member.

Reference throughout this specification will herein be made to a connector which includes at least one central aperture. However, one skilled in the an would realise that the connector could instead only have at least two side wings, and be configured to engage with only two divergent arms of a support member.

Another aspect of the present invention is a connector substantially as described above, the connector also including at least one contraction strap configured to move the side wings towards each other.

Another aspect of the present invention is a connector substantially as described above, the connector also including at least one strap aperture configured to locate at least a portion of a retaining strap.

Another aspect of the present invention is a connector, wherein this connector may be configured to engage with a support member, the support member including a plurality of divergent arms.

Another aspect of the present invention is a connector which can be used in a wide number and range of applications. Reference throughout this specification will in general be made to the connector including or being used to attach an electrical insulator to a support member or post. Such a connector may be engaged with the post to locate and secure an electrical insulator with respect to same.

Reference throughout this specification will also be made to the support member or post which the connector is to be engaged having a plurality of divergent arms. The connector provided may engage with these divergent arms to secure an associated electrical insulator to the support member involved.

In one embodiment, the support member to which the connector is to be engaged may be a T-Post, which is well known in the agricultural field. T-Posts consist of three divergent arms, with a centre arm bisecting two front arms, the front arms being orientated substantially parallel to and in line with one another.

Reference throughout the specification will also be made to the present invention providing a connector for an electrical insulator to be attached to a T-Post. However, those skilled in the art should appreciate that other applications are also envisaged and reference to the above only throughout the specification should in no way be seen as limiting.

In one embodiment, the bulk of the connector may be formed by a main body. This main body may provide a central section. Throughout this specification the term 'central section' of the main body should be taken to mean the portions of the main body on either side of the central aperture.

In the case where the connector does not include a central aperture the central section should be taken to mean the portion of the main body in the vicinity of the side wings.

In one embodiment, the at least two side wings extend from the two ends of the central section.

In one embodiment, the connector may have two side wings and will be referred to as such herein. However, this should not be seen as limiting. One skilled in the art would realise that if the connector were to be used with support members of other configurations than T-posts only one, or three or more side arms (possible in differing planes) may be required.

In one embodiment, the side wings may be formed by projections which extend out from the central section of the main body of the connector.

In one embodiment, the two side wings may at least partially enclose the central aperture (formed in the central section of the main body).

When the connector is used, a T-Post may be inserted into the central aperture to sit between the two side wings and central section of the main body.

In one embodiment, the two side wings of the connector may engage with at least two of the divergent arms of the T-post.

In one embodiment, the two side wings of the connector may engage with the two divergent arms of the T-Post which are orientated substantially parallel to one another, and shall be referred to as such herein.

In one embodiment an interior surface of each side wing may bear against at least one surface of at least one divergent arm of the support member.

The side wings therefore assist in clamping the support member in place within the connector.

In one embodiment, the side wings are formed each side of the central aperture.

This allows the side wings to be moved apart, and contracted together. This allows the connector of the present invention to be utilised with a range of differing sized T-posts or support members.

In one embodiment, the side wings and/or central section of the main body may be formed from a resilient material. This aids movement of the side arms away from one another to allow engagement of a support member and towards one another to secure the support member in position.

In one embodiment, the central aperture may engage with a further divergent arm of the support member. In the case of a T-post this may be the central divergent arm. However, this should not be seen as limiting as the connector of the present invention may in some embodiments only engage with two divergent arms of a T-post or other support member.

Throughout this specification the term 'strap engagement element' should be taken as meaning an element which is capable of engaging a strap.

The strap engagement element may include, for example;
  A strap lock (as described later on), which is configured to secure the strap into a defined position, or
  A hole, slot or aperture through which a strap may be positioned and/or secure into position, or
  Any other means of engaging a strap.

The strap engagement element may allow for either direct or indirect engagement to a strap.

For example, a strap may engage a strap engagement element directly, for example when the engagement element is a strap lock. This may be via a ratchet means on the strap lock which interacts with protrusions on the strap (in the manner of a cable tie, but with the ratchet means formed integrally into the strap lock of the connector). Alternatively, the strap engagement element may include a clamping portion which is tightened against the strap when the strap is in the desired position.

Alternatively, the strap may engage a strap engagement element indirectly, for example when the engagement element is a hole, slot or aperture. In this case, a strap may be positioned through the strap engagement element and secure or lock onto itself, for example as a cable tie works, alternatively the strap may be feed through a complementary loop on one end of the strap to secure it into position.

Additional examples of a strap engagement element may include a piece of rigid plastic (or other material) which may engage the two side wings, or a spring between same.

Throughout this specification the term 'contraction strap' should be taken as meaning a strap which is capable of contracting or decreasing the distance between the side wings.

In one embodiment, the term 'strap' should be taken as meaning any strip of material which can be used to connect the connector to the support post.

The strap may be made out of a variety of materials, for example, plastic, but may be any other suitable material such as metal or leather.

In some embodiments, the strap may include means to connect substantially one end of the strap with the other, for example in the configuration of a cable tie. Alternatively, the strap may include at least one means of engaging the strap to the strap engagement element, for example protrusions which will secure or lock into a ratchet portion on the strap engagement element.

In one embodiment, the strap may be a length of plastic material in the configuration of a cable tie. However, this should not be seen as limiting, as the strap may simply be a length of material which is secure into position at each end by a strap locking means.

In one embodiment, the connector may include one contraction strap, and shall be referred to as such herein. However, this should not be seen as limiting, as in some instances the connector may include two or more contraction straps. For example two contraction straps may provide a firmer and more secure connection of the connector to a support member.

In one embodiment, the contraction strap may be configured to pull the at least two side wings into contact with at least two divergent arms of the support member.

In one embodiment the at least one contraction strap may be attached to at least one of the side wings. In some embodiments the contraction strap may be formed as part of a side wing, but in more preferable embodiments it is attached separately.

In one embodiment, each side wing may include at least one strap engagement element.

In one embodiment, each side wing may include at least one strap lock.

Throughout this specification the term 'strap lock' should be taken as meaning a locking element which is able to directly secure the contraction strap in either a loosened or tightened position.

This may be via a ratchet means on the strap lock which interacts with protrusions on the strap (in the manner of a cable tie, but with the ratchet means formed integrally into the strap lock of the connector). Alternatively, the strap engagement element may include a clamping portion which is tightened against the strap when the strap is in the desired position.

In one embodiment, the strap lock may also include a release, which allows the strap to be loosened or removed.

Alternatively, each side wing may include at least one hole, slot or aperture which acts to indirectly engage the strap to the connector.

Alternatively, the two side wings may include at least one strap lock and at least on hole, slot or aperture respectively.

This would allow, for example, an indirect connection to one side wing, such as feeding the strap through a complementary loop on one end of the strap to secure it into position onto one side wing (either before, or after manufacture, sale or use). The second side wing may include a strap lock, which allows the strap to be quickly, easily and directly secured in the desired (i.e. tightened) position.

In one embodiment, the contraction strap may be manufactured separately from, and sold either along with, separately, or engaged with at least one side wing of the connector. This allows easy manipulation of the strap for replacement, repair or maintenance.

In one embodiment, the contraction strap which is attached to one side wing is engaged with the strap lock on the second side wing, and tightened once the connector has been positioned correctly on and around the support member.

The contraction strap is used to contract the at least two side wings towards one another. This means the at least two side wings firmly engage with the T-Post to which they are connected. This prevents the connector from slipping up or down the T-Post, rotating around or being pulled off same.

In one embodiment, the movement of the two side wings towards one another has the additional affect of contracting the central aperture. This may occur due to the at least two side wings being formed off the central section of the main body, and thus being adjacent to the central aperture. This is useful when the central aperture is engaged with a further arm of the T-Post, as the central aperture is contracted and thus firmly engaged with this arm of the T-Post.

In another embodiment of the present invention, the connector may include instead of a contraction strap at least one strap engagement element in the form of a hole, slot or aperture, herein referred to as a strap aperture configured to locate at least a portion of a retaining strap.

Throughout this specification the term 'retaining strap' should be taken to mean a strap which is configured to hold or retain the support member within the connector.

In one embodiment, the central section of the main body of the connector may include at least one strap aperture in which a retaining strap may be located. However, this should not be seen as limiting as one skilled in the art would realise that the strap aperture may also be positioned in the main body.

In one embodiment, the central section of the main body may have a strap aperture on either side of the central section, i.e. on either side of the central aperture, and shall be referred to as such herein.

In one embodiment, the retaining strap may be placed through the at least one aperture and encircle the support member.

In one embodiment, the retaining strap may encircle both the side wings and the support member.

In this position the retaining strap may be contracted or tightened to move the two side wings towards one another and thus firmly engage the at least two side wings with the support member.

However this should not be seen as limiting. In alternative embodiments, the retaining strap may not contract the at least two side wings towards one another, and may instead aid the location and retaining of the connector in one position by engaging with an aperture, or other location means in the support member.

Reference throughout the specification will be made to a retaining strap contracting the at least two side wings. However, those skilled in the art should appreciate that the retaining strap may retain the connector in other ways and reference to the above only throughout this specification should in no way be seen as limiting.

In one embodiment, the strap aperture may extend along a substantial length of the central section.

In one embodiment, the retaining strap may also encircle the end of the support member arm positioned in the central aperture.

Having the strap aperture extending along the central section allows a retaining strap, when positioned to engage with the central arm of the support member. This allows the retaining strap to engage with different sized support members, having different length central arms. When the central arm is short, the retaining strap will be positioned closer to the side wings, whereas when the central arm is long, the retaining strap will be positioned further away from the side wings.

In embodiments where the connector does not include a central aperture, a T-post would be positioned in the connector with the central arm extending out from the connector. In this case the retaining strap may also encircle the central arm of the T-post.

In one embodiment, the retaining strap may be locked or secured into the tightened position by engaging with itself after encircling the support member and/or side wings.

This may be via the strap having a configuration similar to that of a cable tie, or via any other known method to those skilled in the art.

Alternatively the retaining strap may be configured to attach to one point on the main body, or central portion thereof, and be secured or locked into a strap lock on another portion of the main body, or central portion thereof.

In an alternative embodiment, the connector may include both at least one contraction strap to move the side wings towards one another, and at least one strap aperture in the central section configured to locate a retaining strap.

The use of the contraction strap and/or retaining strap to move the side wings towards one another in conjunction with a central aperture which can open to allow the side wings to move apart, means that the present invention can be used with multiple sizes of support members. Many different sized support members to be used easily with one connector piece, while ensuring that the connector does not slip when in use.

The connector provided can also be used on any side of a T-Post, engaging with any two divergent arms, and in some orientations all three. However, those skilled in the art will realise that the connector may easily engage with any two support members and still provide a solid connection.

Another aspect of the present invention is a kit set, including: at least one connector substantially as herein described, and at least one strap substantially as herein described.

Another aspect of the present invention is a method of engaging a connector with at least on contraction strap substantially as described herein with a support member, the method including:
a) locating at least two divergent arms of the support member within the side wings of the connector,
b) contracting at least one contracting strap to move the side arms towards one another, and
c) securing the contracting strap to engage the support member relative to the connector.

Another aspect of the present invention is a method of engaging a connector with at least one strap aperture substantially as described herein with a support member, the method including:
a) locating at least two divergent arms of the support member within the side wings of the connector, and
b) locating at least one retraining strap through at least one strap aperture in the main body of the connector,
c) encircling the support member with the retaining strap.
d) securing the retaining strap to engage the support member relative to the connector.

At least one embodiment of the present invention therefore provides significant advantages over the prior art.

The present invention may be used to provide a "Universal" connector is easy to use. The flexibility provided by the connector's shape makes it easy to use with a range of different sized support members, without moving or slipping from the intended position.

DETAILED DESCRIPTION OF THE INVENTION.

Further aspects of the present invention will become apparent from the following description which is given by way of example only and with reference to the accompanying drawings.

DETAILED DESCRIPTION OF THE INVENTIVE EMBODIMENTS

Figure 1A:
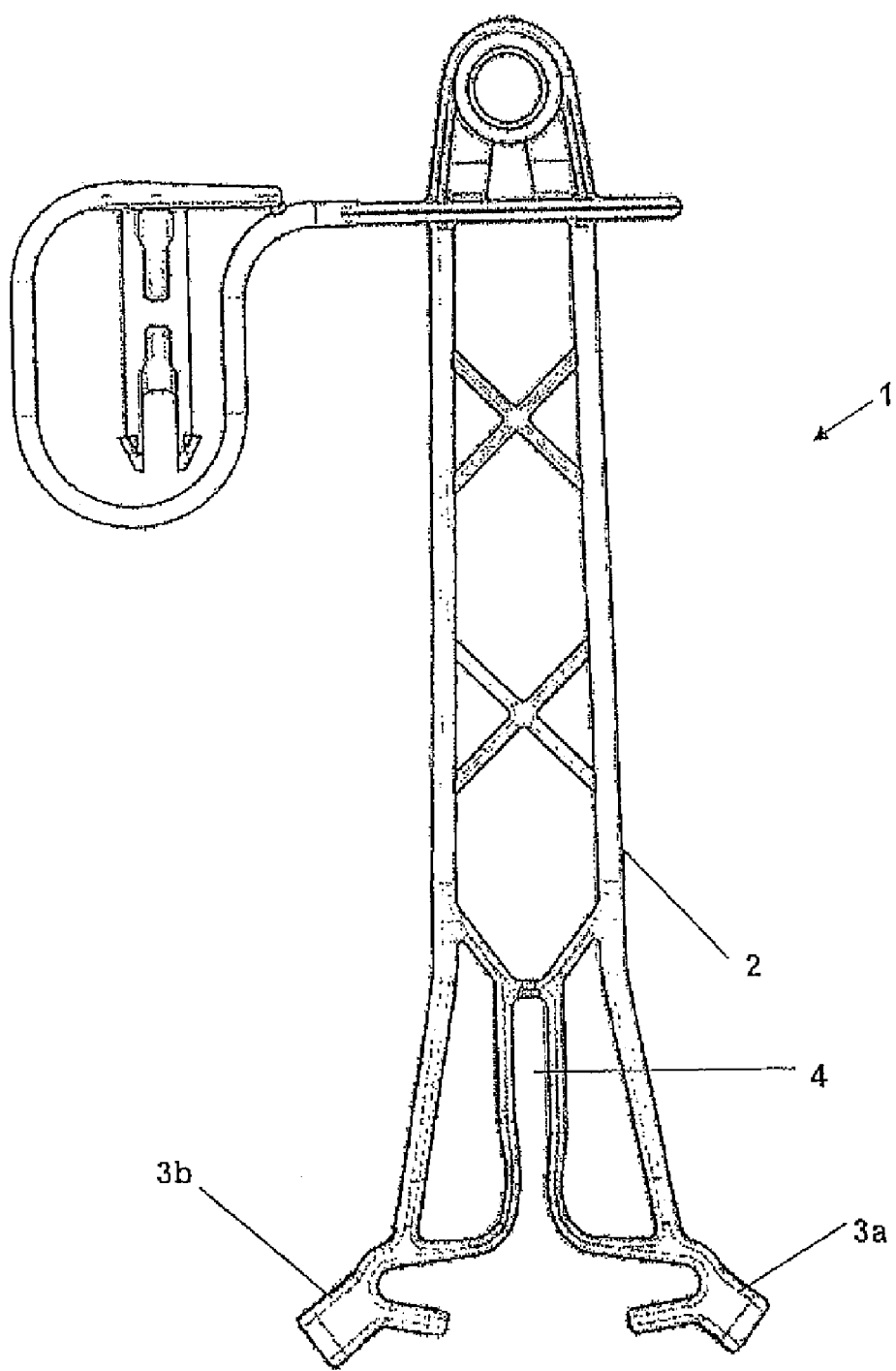
FIGS. 1A and 1B show a side view of a connector in accordance with one embodiment.
Figure 1B:
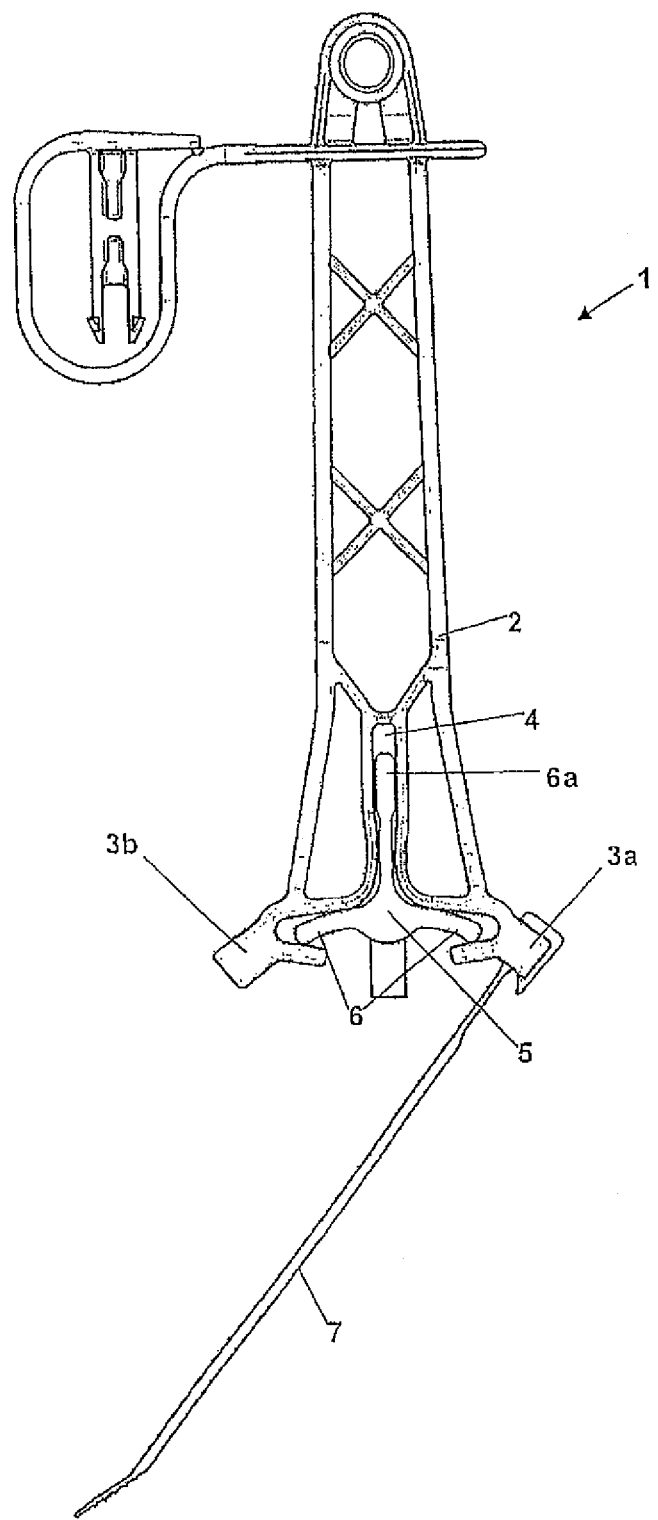

FIGS. 1A and 1B show a side view of a connector in accordance with one embodiment.

FIG. 1A shows a connector (1) which is configured to engage with a support member which has a plurality of divergent arms. The connector includes a main body (2) which includes at least two side wings (3a and 3b), and a central aperture (4).

As the central aperture (4) allows the side wings (3a) and (3b) to be moved apart, and contracted together, the connector (1) can be used with a range of different support members which have diversion arms of different shapes. The T-Posts and their divergent arms (6) are generally found in sizes of between 1¼ inches and 1½ inches. The present invention can be used as a connector to support members of all of these sizes.

FIG. 1B shows the connector engaged with a support member in accordance with one embodiment of the present invention. FIG. 1B shows a connector (1) which engages with a support member (5), where the support member includes a plurality of divergent arms (6). The connector includes a main body (2), at least two side wings (3a and 3b), a central aperture (4) which engages with a central divergent arm of the support member (6a), and a contraction strap (7). The contraction strap (7) is configured to connect to the other side wing (3b) via means of a strap lock (not shown) and tightened. This will bring the side wings (3a) and (3b) towards one another. This tightens the side wings (3a and 3b) of the connector (1) with respect to the support member (5) and ensures that the connector does not slip or move about the support member (5) when in use.

As the central aperture (4) allows the side wings (3a) and (3b) to be moved apart, and contracted together, the connector (1) can be used with a range of different support members which have diversion arms of different shapes. The T-Posts and their divergent arms (6) are generally found in sizes of between 1¼ inches and 1½ inches. The present invention can be used as a connector to support members of all of these sizes.

Figure 2A:
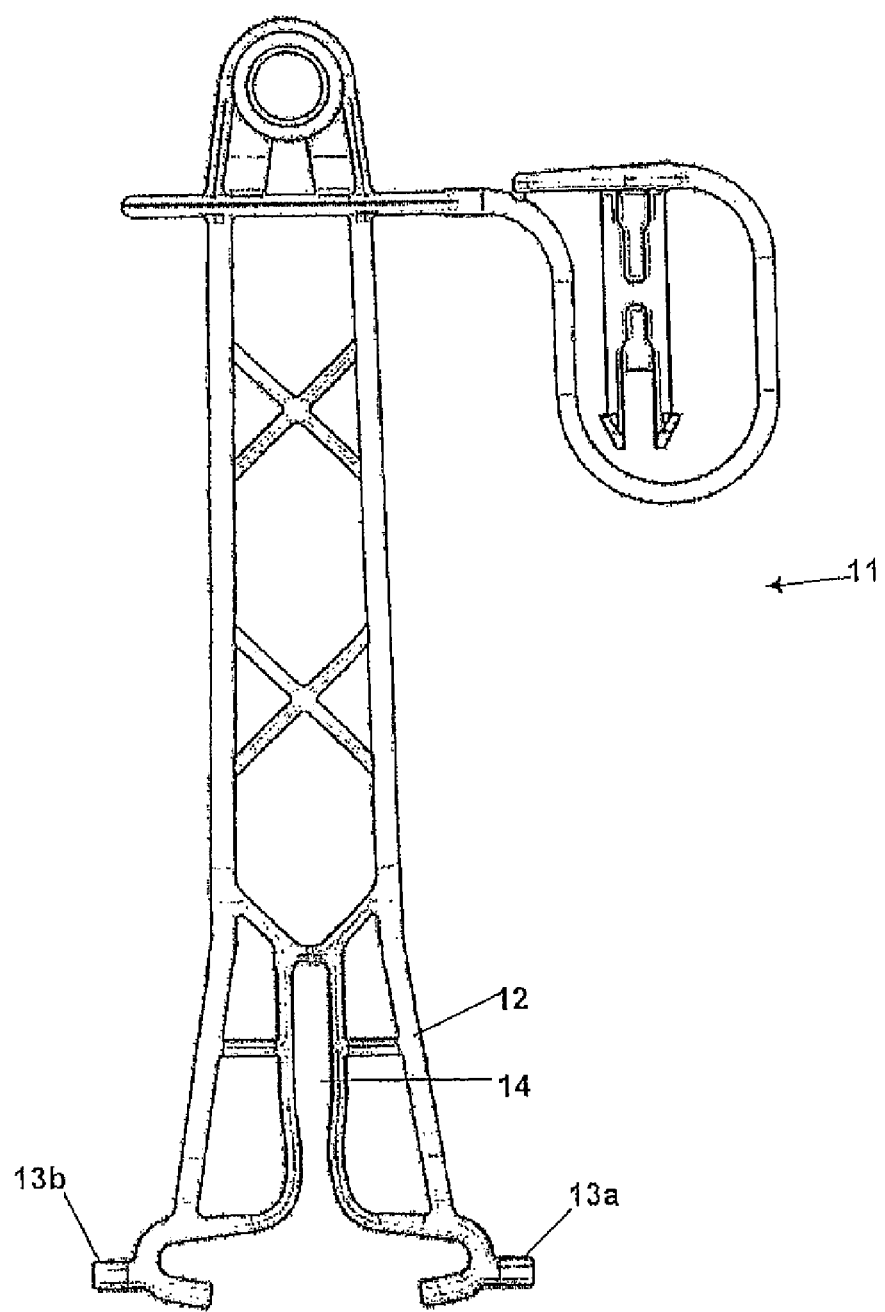
FIGS. 2A and 2B show a side view of a connector according to another embodiment of the present invention.
Figure 2B:
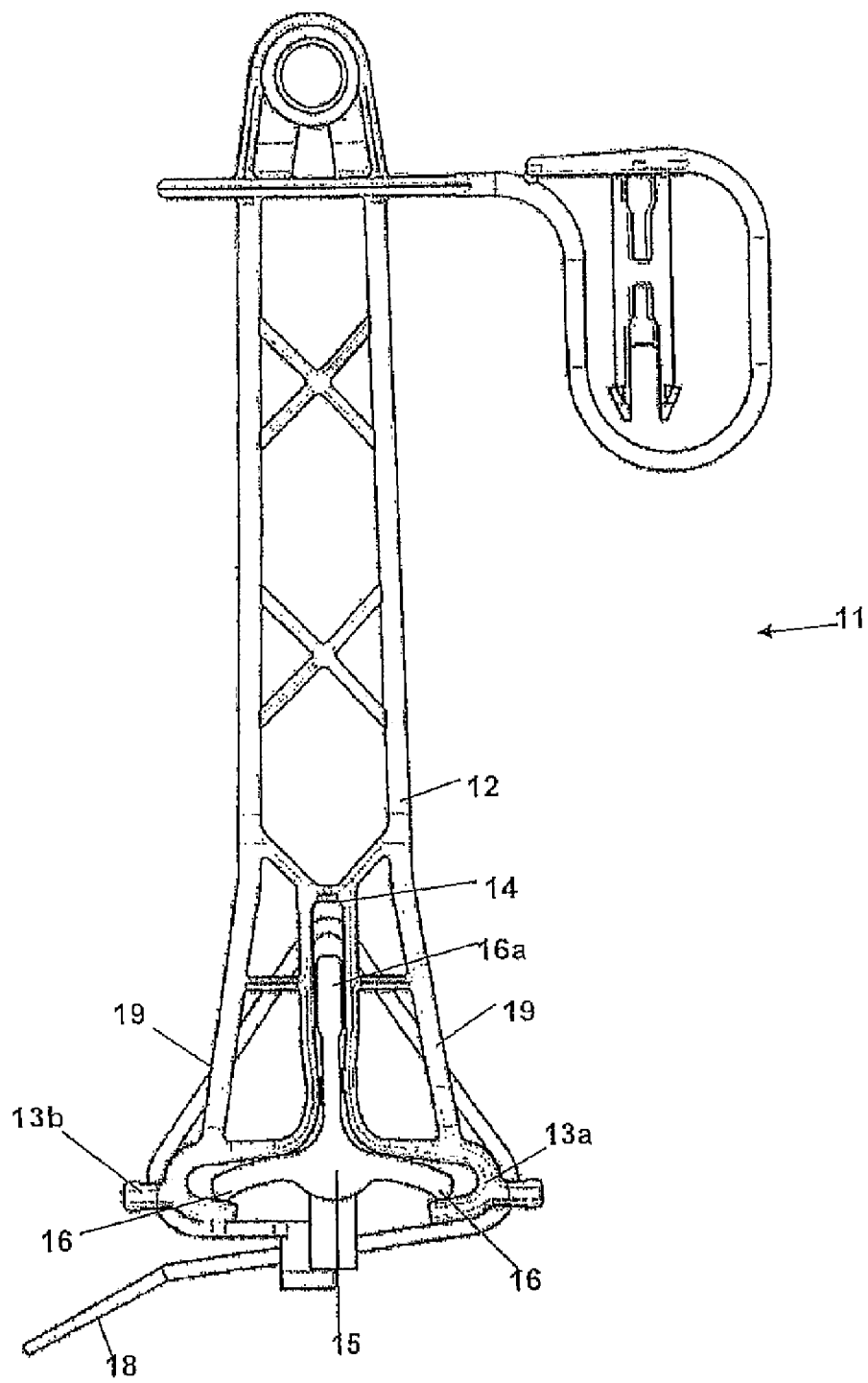

FIGS. 2A and 2B show a connector according to another embodiment of the present invention. This shows a connector (11), which includes a main body (12), two side wings (13a) and (13b), and a strap aperture (not shown).

FIG. 2B shows the embodiment shown in FIG. 2A in use.

FIG. 2B shows a connector (11) including a main body (12), two side wings (13a) and (13b), and a central aperture (14), in connection with a support member (15). The central aperture (14) is connected to a central divergent arm (16a) and the side wings are in contact with two further divergent arms (16). A strap location aperture (19) locates a retaining strap (18) which encircles the support member and is threaded through the strap aperture (19) and engaged with itself. In one embodiment, this retaining strap contracts the side wings (13a) and (13b) to form a close contact with the support member (15).

Figure 3:
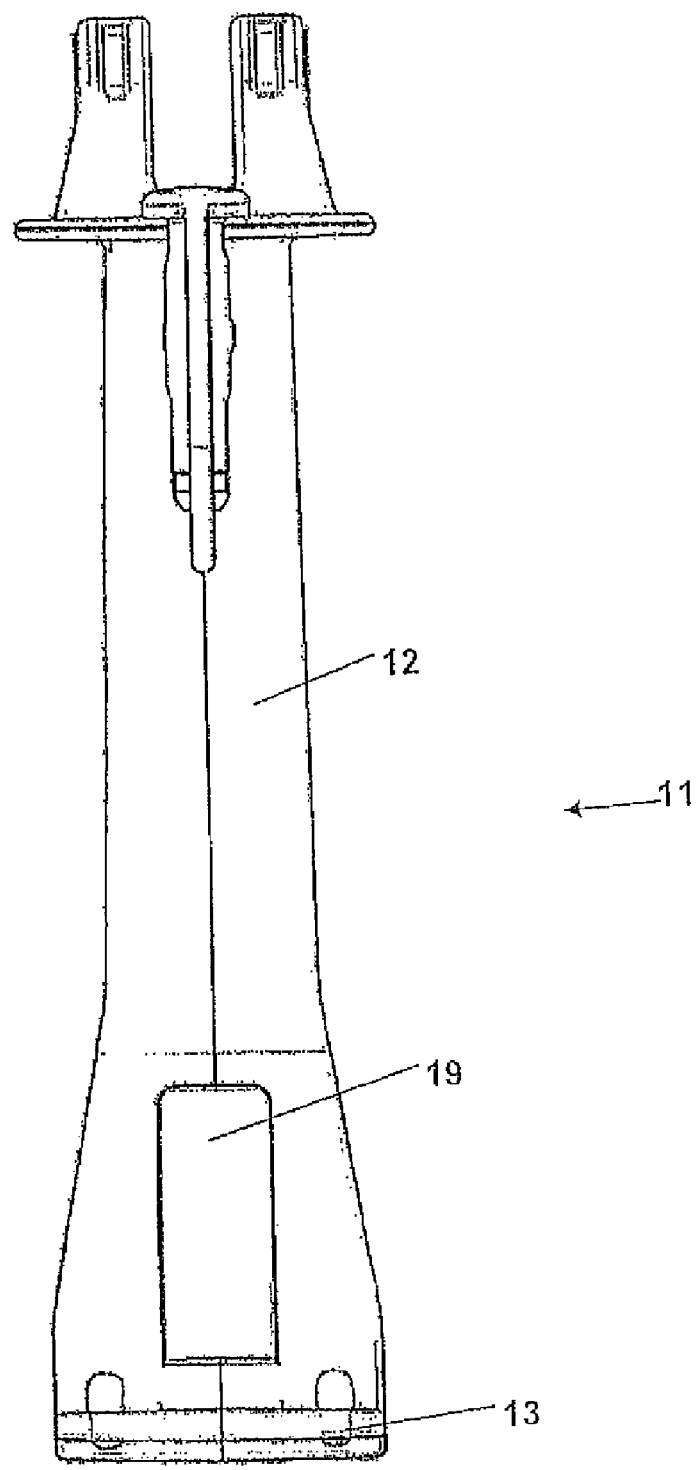
FIG. 3 shows another side view of the device shown in FIGS. 2A and 2B.

FIG. 3 shows another side view of the device in accordance with the embodiment shown in FIGS. 2A and 2B. FIG. 3 shows how the strap aperture (19) of the connector (11) extends from the central section of the main body (12) down towards the side wings (13). This allows a retaining strap to be located at a number of variable positions within the strap aperture, dependant on a central arm of the support member. If the central arm is long, the retaining strap will be located in the far end of the strap aperture, as seen in FIG. 2B. Conversely, if the connector is not engaged with a central arm, the retaining strap may be located close to the side wings.

Figure 4A:
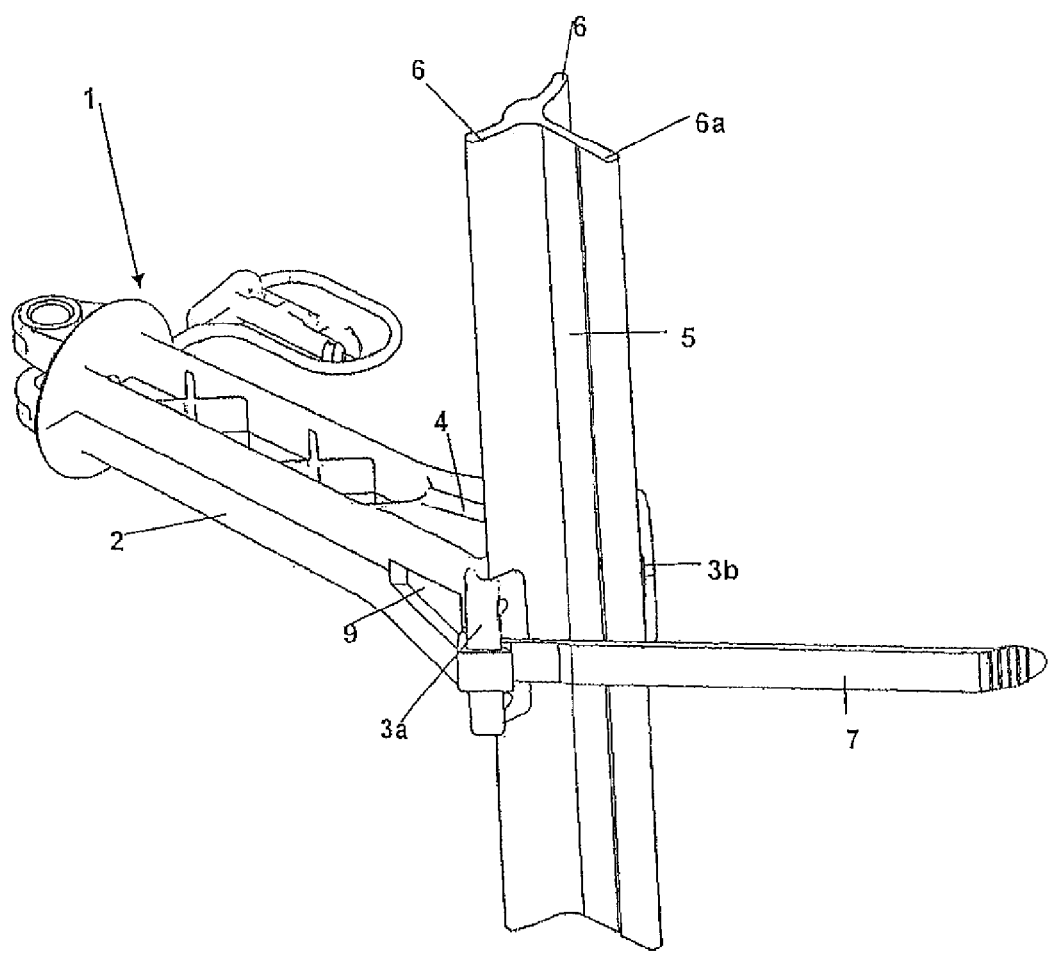
FIGS. 4A and 4B show a perspective view of the device shown in FIGS. 1A through to 2, in conjunction with a support member as an example of a use of the present invention.

FIG. 4A shows an embodiment of the device from a perspective view in use with a support member (5). FIG. 4A shows the main body (2), in conjunction with the side wings (3) and the contraction strap (7), used to attach the connector (1) to a support member (5), without the central aperture (4) engaging with a central divergent arm (6a).

The connector (1) can engage with all three arms of the support member as seen in FIG. 1B, or with only two divergent arms of the support member (5) as seen in FIG. 4A. The contraction of the side wings (3) with the contraction strap (7) will ensure that the connector has good contact with the support member (5), even when only two arms of the support member are in contact with the connector.

In FIG. 4A, a strap aperture (9) is also seen in addition to the contraction strap (7). A retaining strap can also be located in the strap aperture (9) further ensure that the connector does not move when attached to a support member (5).

Figure 4B:
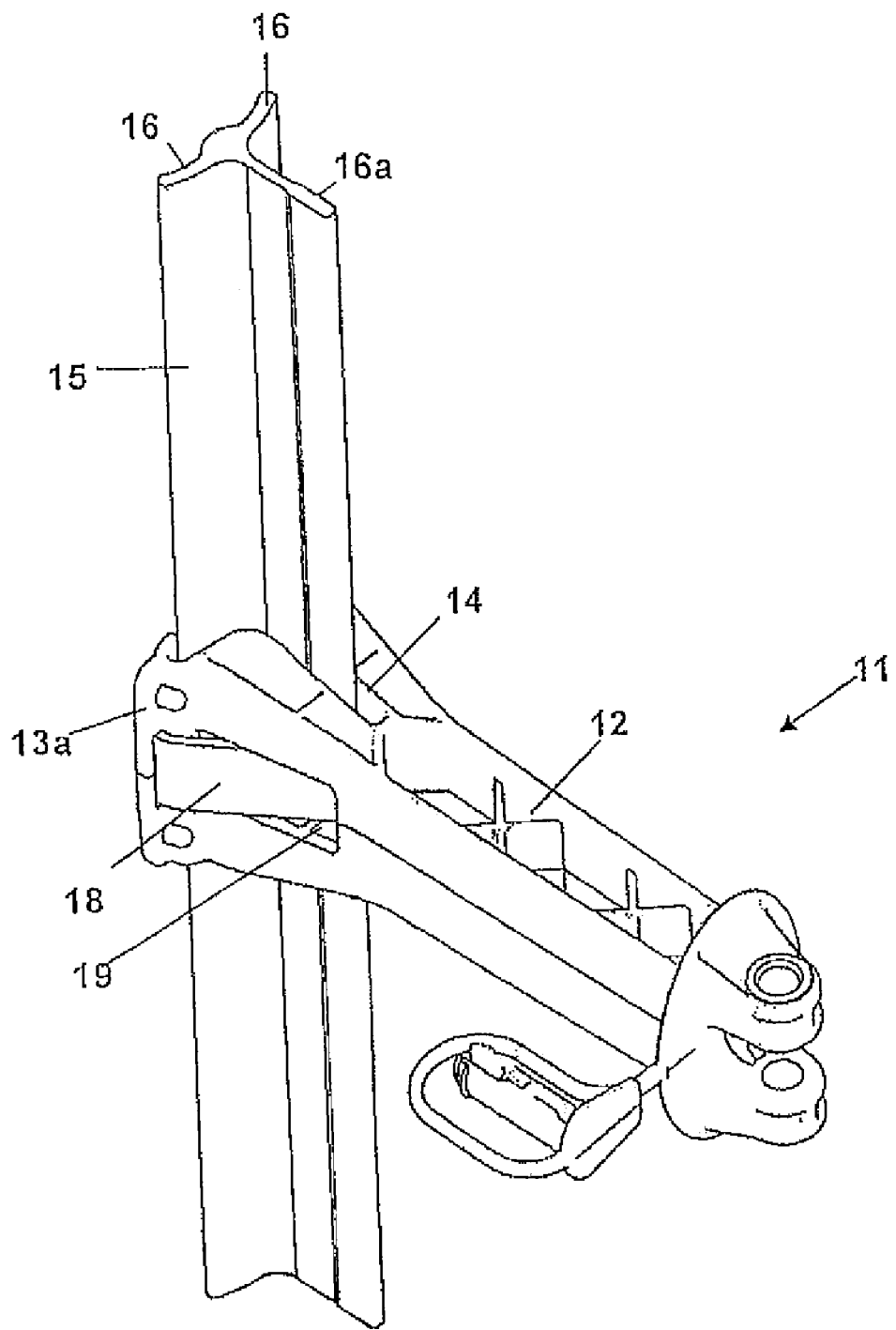

FIG. 4B shows a perspective view of the device with a support member (15) according to another embodiment. This is a perspective view of the present invention configured in accordance with FIG. 2B. The connector (11) may also be used in the opposite orientation to the one shown in this figure, where the side wings (13) contact the divergent arms (16) but the central aperture (14) does not.

In use, a retaining strap (18) is threaded through the strap aperture (19) and around the support member, contracting the side wings (13) and ensuring that the connector (11) does not slip or move about the support member (15). This allows a firm connection whether the central aperture (14) is engaged with a central divergent arm (16a) or not. In one embodiment, the strap aperture (19) extends down towards the side wings (13) as seen in FIG. 3. This means that when the connector is used with two arms only, the retaining strap (18) is located close to the side wings (13). The retaining strap (18) will contract the side wings (13) towards each other, and thus a strong connection is maintained, even when the connector is engaged with only two arms of the support member (15).

At least one embodiment of the present invention provides a "universal" connector which is easy to use. The flexibility provided by the connector shape makes it useful for a range of different sized T-Posts, and the connector can engage with these T-Posts without moving or slipping from the intended positions. The connector provider can also be used on any side of a T-Post, engaging with any two divergent arms of the T-Post, or in some orientations all three arms.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A connector configured to engage with a T post support member, said support member including a central arm and a plurality of divergent arms, the connector comprising:
a main body comprising a central section having a central recessed portion defining an elongated recess having an open end, a closed end, and opposing inner side surfaces, the central recessed portion configured to receive and contact the central arm of the support member, and a main aperture passing through the central section and intersecting the inner side surfaces of the central recessed portion, wherein the inner side surfaces are configured to slidably engage with the central arm of the support member;
a side wings extending from the main body on each side of the central recessed portion at the open end of the central recessed portion, each of said side wings being configured to engage with one of the divergent arms of the support member, and wherein each side wing comprises a strap engagement element,
wherein the main aperture and strap engagement elements are configured to receive and locate a strap configured to encircle the support member and secure the connector to the support member, and
wherein the main aperture is an elongate opening extending through each inner side surface along the central section from the closed end of the central recessed portion towards the side wings, and configured to bear against and pass the strap therethrough with a tensional force; and
a strap configured to be received by the main aperture and strap engagement elements to encircle the support member and secure the connector to the support member, wherein the strap is adjustably slid within the recess and tensioned between the strap engagement elements such that the strap abuts the central arm of the support member and clamps the side wings toward each other.

2. A connector as claimed in claim 1, wherein an interior surface of each side wing is configured to bear against a surface of an arm of the support member.

3. A connector as claimed in claim 1, wherein at least one strap engagement element is formed by a strap aperture.

4. A connector as claimed in claim 1, wherein at least one strap engagement element is formed by a strap lock.

5. A connector as claimed in claim 1, further comprising wherein the strap is in the form of a contraction strap which is attached to one of the side wings and configured to engage with a strap lock on the other side wing to secure the strap in either a loosened or tightened position.

6. A connector as claimed in claim 1 wherein the connector is used to associate at least one wire with a support member.

7. A kit set, the kit set including:
at least one connector configured to engage with a T post support member, the support member including a central arm and a plurality of divergent arms, the connector comprising i) a main body, comprising a central section having a central recessed portion defining an elongated recess having an open end, a closed end, and opposing inner side surfaces, the central recessed portion configured to receive and contact the central arm of the support member, and a main aperture passing through the central section and intersecting the inner side surfaces of the central recessed portion, wherein the inner side surfaces are configured to slidably engage with the central arm of the support member, and ii) a side wings extending from the main body on each side of the central recessed portion at the open end of the central recessed portion, each of said side wings being configured to engage with one of the divergent arms of the support member, and wherein each side wing comprises a strap engagement element, wherein the main aperture and strap engagement elements are configured to receive and locate a strap, and wherein the main aperture is an elongate opening extending through each inner side surface along the central section from the closed end of the central recessed portion towards the side wings; and a strap configured to be received and located by the main aperture and strap engagement elements to encircle the support member and secure the connector to the support member wherein the strap is adjustably slid within the recess and tensioned between the strap engagement elements such that the strap abuts the central arm of the support member and clamps the side wings toward each other.

8. A method of engaging a connector with a support member, wherein the connector is configured to engage with a T post support member, the support member including a central arm and a plurality of divergent arms, the connector comprising: i) a main body, comprising a central section having a central recessed portion defining an elongated recess having an open end, a closed end, and opposing inner side surfaces, the central recessed portion configured to receive and contact the central arm of the support member, and a main aperture passing through the central section and intersecting the inner side surfaces of the central recessed portion, wherein the inner side surfaces are configured to slidably engage with the central arm of the support member, and ii) a side wings extending from the main body on each side of the central recessed portion at the open end of the central recessed portion, each of said side wings being configured to engage with one of the divergent arms of the support member, and wherein each side wing comprises a strap engagement element, wherein the main aperture and strap engagement elements are configured to receive and locate a strap configured to encircle the support member and secure the connector to the support member, and wherein the main aperture is an elongate opening extending through each inner side surface along the central section from the closed end of the central recessed portion towards the side wings, the method comprising:

a) locating two divergent arms of the support member within the side wings of the connector;

b) threading a strap through the main aperture and strap engagement elements;

c) encircling the support member with the strap, wherein the strap is adjustably slid within the recess and tensioned between the strap engagement elements such that the strap abuts the central arm of the support member and clamps the side wings toward each other; and d) securing the strap to fasten the support member relative to the connector.

\* \* \* \* \*